US006853669B2

(12) United States Patent
Simpson et al.

(10) Patent No.: US 6,853,669 B2
(45) Date of Patent: Feb. 8, 2005

(54) NANOCRYSTAL WAVEGUIDE (NOW) LASER

(75) Inventors: John T. Simpson, Knoxville, TN (US); Marcus L. Simpson, Knoxville, TN (US); Stephen P. Withrow, Oak Ridge, TN (US); Clark W. White, Oak Ridge, TN (US); Supriya L. Jaiswal, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 92 days.

(21) Appl. No.: 10/315,578

(22) Filed: Dec. 10, 2002

(65) Prior Publication Data

US 2004/0109483 A1 Jun. 10, 2004

(51) Int. Cl.[7] .................................................. H01S 3/08
(52) U.S. Cl. ........................................ 372/92; 372/102
(58) Field of Search ............................... 372/92, 96–99, 372/102

(56) References Cited

U.S. PATENT DOCUMENTS

| | | | | |
|---|---|---|---|---|
| 4,464,762 A | | 8/1984 | Furuya | 372/50 |
| 5,422,907 A | * | 6/1995 | Bhargava | 372/68 |
| 5,621,750 A | * | 4/1997 | Iwano et al. | 372/96 |
| 5,684,817 A | * | 11/1997 | Houdre et al. | 372/45 |
| 5,852,346 A | * | 12/1998 | Komoda et al. | 315/169.3 |
| 6,028,693 A | * | 2/2000 | Fork et al. | 359/248 |
| 6,035,089 A | | 3/2000 | Grann et al. | 385/129 |
| 6,534,798 B1 | * | 3/2003 | Scherer et al. | 257/98 |
| 6,597,721 B1 | * | 7/2003 | Hutchinson et al. | 372/98 |
| 6,744,804 B2 | * | 6/2004 | Deng et al. | 372/92 |
| 2003/0142719 A1 | * | 7/2003 | Fan | 372/108 |
| 2003/0179974 A1 | * | 9/2003 | Estes et al. | 385/2 |

FOREIGN PATENT DOCUMENTS

JP    2000187108 A  * 7/2000  ............ G02B/5/18

OTHER PUBLICATIONS

Min et al., "The role of quantum–confined excitons vs defects in the visible luminescence of $SiO_2$ films containing Ge nanocrystals," Appl. Phys. Lett., 68: 2511–2513, 1996.
Maeda, Y., "Visible photoluminescence from nanocrystallite Ge embedded in a glassy $SiO_2$ matrix: Evidence in support of the quantum–confinement mechanism," 51: 1658–1670, 1995.

* cited by examiner

*Primary Examiner*—Minsun Oh Harvey
*Assistant Examiner*—Phillip Nguyen
(74) *Attorney, Agent, or Firm*—Akerman Senterfitt

(57) ABSTRACT

A solid state laser includes an optical waveguide and a laser cavity including at least one subwavelength mirror disposed in or on the optical waveguide. A plurality of photoluminescent nanocrystals are disposed in the laser cavity. The reflective subwavelength mirror can be a pair of subwavelength resonant gratings (SWG), a pair of photonic crystal structures (PC), or a distributed feedback structure. In the case of a pair of mirrors, a PC which is substantially transmissive at an operating wavelength of the laser can be disposed in the laser cavity between the subwavelength mirrors to improve the mode structure, coherence and overall efficiency of the laser. A method for forming a solid state laser includes the steps of providing an optical waveguide, creating a laser cavity in the optical waveguide by disposing at least one subwavelength mirror on or in the waveguide, and positioning a plurality of photoluminescent nanocrystals in the laser cavity.

37 Claims, 12 Drawing Sheets

100

Photonic Crystal with an Array of Holes

Ref vs WL of PC Material

NANOCRYSTAL WAVEGUIDE (NOW) LASER

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

CROSS-REFERENCE TO RELATED APPLICATIONS

Not applicable.

1. Field of the Invention

The invention relates to solid state lasers, specifically optical waveguide cavity based lasers formed using subwavelength mirrors.

2. Background of the Invention

Integration of optical components within semiconductor microchips has been a goal for many years. Such integration could create new and improved devices. The main reason why this integration has not occurred is the lack of any small CMOS compatible laser sources. Current solid-state lasers generally use gain media of non-standard III–V (or II–VI) materials, such as GaAlAs formed in a multiple quantum well configuration. Such non-standard materials are difficult to fabricate and are highly incompatible with standard semiconductor microchip processes which are generally silicon based.

A solid state laser suitable for integration with standard semiconductor microchip processes would be constructed from silicon-based materials, or at least be CMOS compatible, and would include a semiconductor process compatible optical waveguide material to facilitate energy transport. However, several challenges including lack of suitable mirrors have generally prevented fabrication of laser cavities within optical waveguides.

SUMMARY OF INVENTION

A new type of solid state laser includes an optical waveguide, and a laser cavity including at least one subwavelength mirror, the subwavelength mirror disposed in or on the waveguide. A plurality of photoluminescent nanocrystals are disposed inside the laser cavity. The subwavelength mirror can be a distributed feedback structure (DFB) or a first and a second subwavelength mirror disposed on the respective ends of the laser cavity.

The first and second subwavelength mirrors can comprise a first and a second subwavelength resonant grating (SWG), a first and a second photonic crystal (PC), or a SWG and a PC. The reflective subwavelength mirrors preferably comprise broadband mirrors, the broadband mirrors each providing a reflective bandwidth of at least 5% of center reflective wavelengths of each of the broadband mirrors, the operating wavelength of the laser being within the broadband reflectance of the mirrors. The laser preferably sustains substantially only one propagating mode.

In one embodiment, the laser includes a PC disposed between the two reflective subwavelength mirrors. In this case, the PC is referred to as a photonic band edge structure (PBE). The PBE preferably provides a dielectric band edge which permits the PBE to provide at least 80% transmission at an operating wavelength of the laser. By operating at the dielectric band edge of the PBE, the mode structure of the laser is forced to be single mode ($TEM_{00}$) while still having the energy concentrated in the nanocrystal material. Thus, the laser operated at the dielectric band edge of PBE forces the cavity electromagnetic standing waves to have a single spatial and frequency mode. This dramatically improves the coherence and overall efficiency of the laser as the combined periodicities of the mirror features, such as, high index posts of the SWGs, and the low index PBE holes result in a mode and phase lock of the emission by the laser. Since photoluminescent nanocrystals are within the resulting intensified electromagnetic field, the result is an enhancement to the laser gain, thus increasing the output power of the laser in this embodiment.

The plurality of nanocrystals can comprise silicon. The optical waveguide can comprise $SiO_2$, SixNy, aerogels or solgels. If provided, the SWG can include a plurality of periodically spaced subwavelength features, such as posts, the features formed from $Ta_2O_5$, $TiO_2$, ZnO or ZnSe.

The laser can be disposed on or embedded in a bulk substrate material. The laser can further comprise structure for electrical pumping, the structure for electrical pumping disposed on the bulk substrate material. The structure for electrical pumping can comprise an on-chip RF oscillator.

In an alternate embodiment, the laser is provided a symmetric waveguide structure where the cladding layer above and below the waveguide is the same material. One embodiment of the symmetric waveguide structure is where the optical waveguide in the laser cavity comprises a membrane layer, the membrane layer being suspended above the bulk substrate material. The membrane layer can comprise silicon dioxide and the plurality of photoluminescent nanocrystals can comprise silicon. The bulk substrate material can be silicon.

The optical waveguide can comprise an electro-optic material. In this embodiment, the laser comprises a pair of electrodes for application of a modulating electrical field across the electro-optic waveguide material.

A method for forming a solid state laser includes the steps of providing an optical waveguide, forming a laser cavity including at least one reflective subwavelength mirror disposed in or on the optical waveguide, and positioning a plurality of photoluminescent nanocrystals in the laser cavity. The method can include the step of forming the photoluminescent nanocrystals. The forming step can comprise the steps of disposing a photoluminescent nanocrystal precursor into the laser cavity, and annealing the photoluminescent nanocrystal precursor, wherein the photoluminescent crystal precursor coalesces to form the plurality of photoluminescent nanocrystals. The disposing step can comprise ion implantation. The ion implantation is preferably performed at a plurality of implantation energies to provide a substantially constant implanted dose profile throughout the thickness of the waveguide.

The method can include the step of forming a photonic band edge structure (PBE) between two reflective subwavelength mirrors. The PBE preferably provides a dielectric band edge which permits the PBE to provide at least 80% transmission at an operating wavelength of the laser.

The laser can be disposed on or embedded in a bulk substrate material. In this embodiment, the forming of the laser cavity can comprise forming a membrane layer, the membrane layer suspended above the bulk substrate material. The membrane can comprise silicon dioxide, the silicon dioxide including a plurality of photoluminescent nanocrystals comprising silicon. The bulk substrate material can be silicon.

BRIEF DESCRIPTION OF THE DRAWINGS

A fuller understanding of the present invention and the features and benefits thereof will be accomplished upon review of the following detailed description together with the accompanying drawings, in which:

FIG. 5(a) illustrates a cross-sectional view of a solid state laser having a pair of PBG subwavelength mirrors, the laser cavity including a waveguide having a plurality of embedded photoluminescent nanocrystals, while FIG. 5(b) illustrates a top view of the same.

DETAILED DESCRIPTION OF THE PREFERRED EMBODIMENTS

Figure 1A:
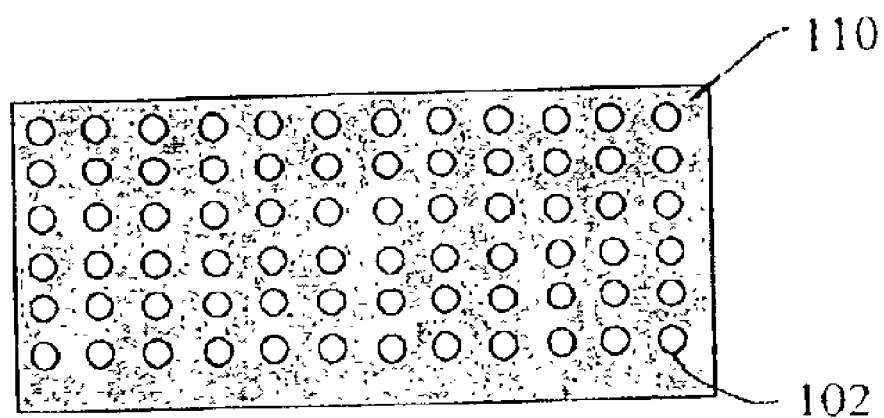
FIG. 1(a) illustrates a perspective view of a photonic crystal (PC) which includes a periodic array of holes.

An integrated solid state laser includes an optical waveguide and a laser cavity including at least one subwavelength mirror disposed in or on the optical waveguide. A plurality of photoluminescent crystals are disposed inside the laser cavity. The mirror and can be a distributed feedback structure (DFB) or a pair of subwavelength mirrors, such as a first and a second subwavelength resonant grating (SWG), a first and second photonic crystal structure (PC), or one SWG and one PC. Forming an integrated laser including a laser cavity within an optical waveguide renders the laser cavity directly accessible to external influences, such as electrical and optical pumping.

Before proceeding with a detailed description of the laser, salient details regarding the subwavelength effect will be first described. In addition, details regarding PCs and SWGs will be described individually prior to describing the laser, which in one embodiment, integrates at least one PC and one SWG. Details regarding the well known subwavelength distributed feedback structure (DFB) will not be presented here, but can be found from sources such as SPIE WEB (The website for optics, photonics, and imaging). One such example of a DFB structure found at this website is "Analysis and structure of distributed-feedback laser (DBV) and distributed Bragg reflector (DBR) laser using regrowth-free surface grating technology". Djie S. et et al. Nanyang Technological Univ. SPIE Proc. Vol. 4594, pgs. 250–259, Design, Fabrication, and Characterization of Photonic Devices II, October 2001.

It is known that as the periodicity of a medium becomes comparable with the wavelength of electromagnetic waves traveling therethrough, the medium can begin to significantly inhibit the wave's propagation. A PC is one type of subwavelength optical structure that can be used for certain electromagnetic (EM) wave applications. PCs are composite periodic structures made up of two different dielectric materials. Both of the dielectric materials should be nearly transparent to electromagnetic radiation in the frequency range of interest. However, the composite periodic structure may not be transparent to the frequency range of interest, due to electromagnetic scattering at the interfaces between the two dielectric components. Intervals of prohibited frequencies are called photonic band gaps.

Relying on the subwavelength wave inhibition effect, PCs are two or three-dimensional periodic array structures in which the propagation of EM waves may be described by band structure types of dispersion relationships resulting from scattering at the interfaces between the two dielectric components. Waveguide dispersion is the term used to describe the process by which an electromagnetic signal is distorted by virtue of the dependence of its phase and group velocities on the geometric properties of the waveguide. These photonic band gap structures provide electromagnetic analogs to electron-wave behavior in crystals, with electron-wave concepts such as reciprocal space, Brillouin zones, dispersion relations, Bloch wave functions, Van Hove singularities and tunneling having electromagnetic counterparts in a PC.

PCs can be formed with added local interruptions in an otherwise periodic photonic crystal, thereby generating defect or cavity modes with discrete allowed frequencies within an otherwise forbidden photonic band gap range of frequencies. In a perfectly periodic photonic crystal, allowed photonic states are quantized, with band gaps having no allowed states between discrete allowed states. However, when a periodic array of features, such as holes, is introduced into a waveguide material to form a perfectly periodic photonic crystal, the wavevector k becomes quantized and limited to $\pi/a$, where a is the spatial period of the holes. In addition to putting a limit on wavevector values, the introduction of an array of holes in a waveguide has the effect of folding the dispersion relations ($\omega_n(k)$) of the strip waveguide and splitting the lowest-order mode to form two allowable guided modes. The splitting at the Brillouin zone edge is referred to as a band gap. The size of the band gap is determined by the relative dielectric constants of the waveguide material and the material filling the periodic structures, such as air in the case of holes. The larger the difference in relative dielectric constants, the wider the gap.

FIG. 1(a) shows a perspective view of a PC 100 formed from a 12×6 periodic array of features which comprise holes, each hole represented as 102. Holes 102 are disposed in a dielectric waveguide 110 and arranged in a periodic fashion with a substantially constant inter-hole spacing. Thus, no defect is included. Although holes 102 are shown in FIG. 1(a), holes 102 can be replaced by low refractive index features, the low refractive index being relative to the higher refractive index waveguide material.

Figure 1B:
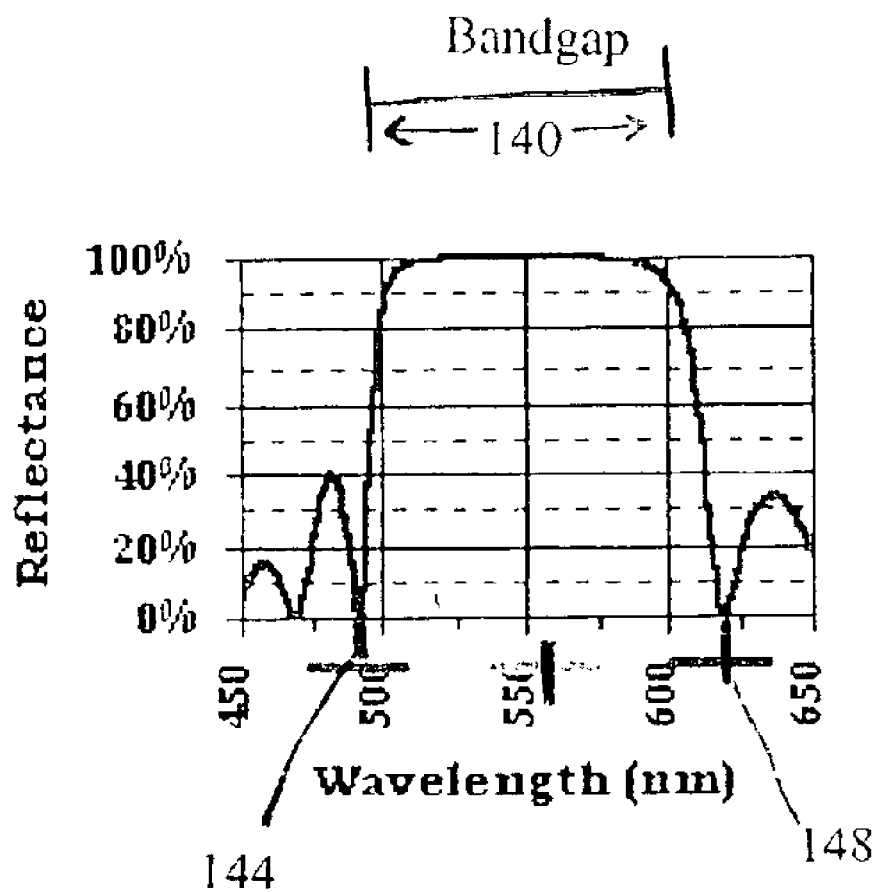
FIG. 1(b) illustrates the spectral response of the PC in FIG. 1(a) demonstrating a broadband reflectance.

FIG. 1(b) shows the reflective response of PC 100 shown in FIG. 1(a). PC 100 is seen to function as a broadband mirror in the band from about 500 to 600 nm. This band is referred to band gap 140, as wavelengths in this band are not transmitted by PC 100. FIG. 1(b) also reveals two band edges 144 and 148, band edges 144 and 148 being at wavelengths which are nearly 100% transmissive, the band edges located adjacent to the edges of band gap 140. In the embodiment where the low refractive index periodic features are holes, band edge 144 is referred to as the air band edge. Band edge 148 is referred to as the dielectric band edge. The dielectric band edge 148 will always be at a longer wavelength (i.e. lower frequency) as compared to the air band edge 144, or more generally at a longer wavelength relative to the low refractive index material band edge.

If PC 100 is operated at dielectric band edge 148, then the optical energy is concentrated within the high index dielectric waveguide region 110 which is disposed between holes 102. However, if PC 100 is operated at air band edge 144, the optical energy is concentrated within the low index holes 102.

If a defect is included into an otherwise periodic PC, an allowed photonic state can be created within the band gap. This state is analogous to a defect or impurity state in a semiconductor which introduces an energy level within the band gap of the semiconductor. A defect in the otherwise periodic PC structure is formed by incorporating a break in the periodicity of the PC structure. PC defects can take the form of a spacing variation using constant features, use features having a different size or shape, or use a different material. Introduction of a PC defect may result in the creation of a resonant wavelength within the band gap.

Subwavelength resonant gratings (SWGs) are a second type of subwavelength optical structure. Grating structures are generally known in the art to provide a method of dispersing incident electromagnetic wave energy. In particular, gratings comprising periodic elements have been used to diffract light incident on a grating created by periodic slits cut into a given material. When light is incident on the surface of a single diffraction grating, the light may be reflected (or backward diffracted) and/or transmitted (or forward diffracted) at angles that depend upon the periodicity of the grating relative to the wavelength of the incident light and the light's angle of incidence.

Optical wavelength may be defined as the wavelength of an EM wave in a given material and is equal to the wavelength of the wave in a vacuum divided by the material's refractive index. As the period of the grating approaches the optical wavelength of the incident radiation, the diffracted orders begin propagating at increasingly larger angles relative to the surface normal of the grating. Eventually, as the grating period is reduced and approaches the optical wavelength of the incident radiation, the angle of diffraction approaches 90 degrees, resulting in propagation of the radiation confined to the plane of the grating. This subwavelength condition effectively couples the fields of the incident radiation within the grating structure, a direction transverse to the surface normal of the grating provided the grating structure has a higher refractive index than the surrounding material and provides a mechanism to couple the diffracted energy into an orthogonal guided wave mode.

An example of the formation and use of a SWG is described in U.S. Pat. No. 6,035,089, by Grann, et. al ("Grann"), which is assigned to Lockheed Martin Energy Research Corporation, predecessor to the assignee of the current application. Grann describes a single SWG that uses periodically spaced high refractive index "posts" embedded in a lower refractive index dielectric waveguide material to form an extremely narrowband resonant reflector.

A SWG which functions as a zeroth order diffraction grating can be represented by an effectively uniform homogeneous material having an effective refractive index ($n_{eff}$). Under particular incident wave configurations, such as a substantially normal incident beam, and certain structural constraints, such as the refractive index of the medium surrounding the grating<refractive index of the waveguide<refractive index of the posts, a subwavelength structure may exhibit a resonance anomaly which results in a strong reflected beam over an extremely narrow bandwidth. If the incident radiation is not within the SWG resonant bandwidth, most of the energy of the incident beam will propagate through the grating in the form of a transmitted beam.

This resonance phenomenon occurs when electromagnetic radiation is trapped within the grating material due to total internal reflection. If this trapped radiation is coupled into the resonant mode of the SWG, the field will resonate and redirect substantially all of the electromagnetic energy backwards. This resonance effect results in a nearly total reflection of the incident field from the surface, which may be designed to be extremely sensitive to wavelength.

Grann's embedded grating structure results in minimal sideband reflections. Since Grann's resonant structure is buried within a waveguide, both the input and output regions of the grating share the same refractive index, resulting in minimal or no Fresnel reflection losses. Thus, reflection losses are minimized permitting operation as an extremely reflective resonant grating.

Figure 2A:
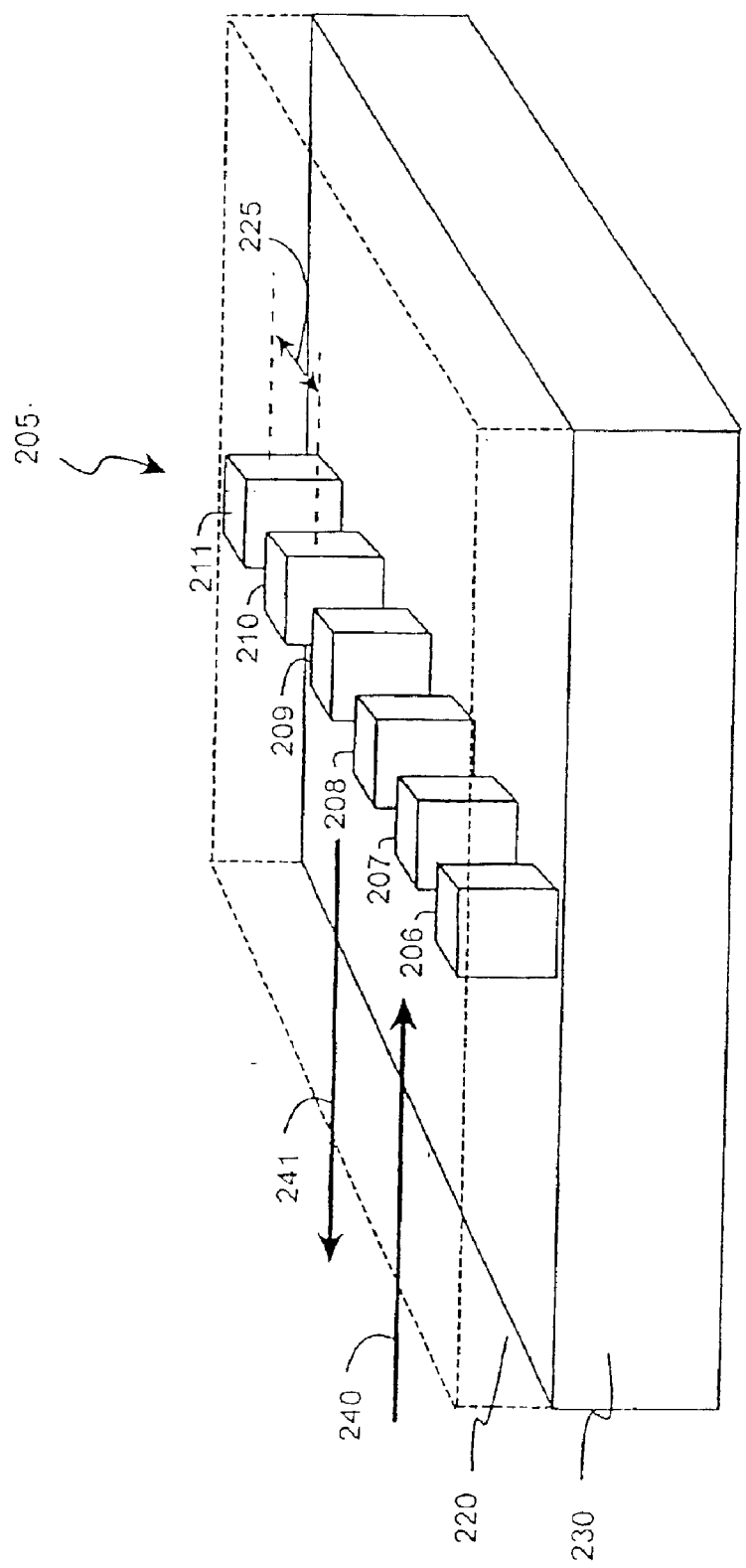
FIG. 2(a) illustrates a perspective view of a SWG having six posts.

Referring to FIG. 2(a), a broadband resonant reflecting SWG 205 is shown which is formed from six high refractive index posts 206–211 in a waveguide material 220. Posts 206–211 are periodically spaced having a given post-to-post spacing called a grating period (T) 225. The refractive index of material comprising posts 206–211 should be greater than that of the waveguide material 220. Cladding layer 230 having a refractive index lower than both the waveguide material and post material may be used to physically support SWG 205. Cladding layer 230 may comprise several individual layers, each having somewhat different physical properties.

Six to ten (or possibly more) posts 206–211 are believed to be a minimum number for SWG 205 to function as a resonant reflector and would correspond to cavity width of three to five resonant wavelengths, since the grating period 225 is nominally one half of a resonant wavelength. Feature shapes also influence SWG 205 function. Shapes such as square, cylindrical and rectangular have demonstrated successful results. Other shapes are also possible. Grating period 225 should preferably be less than the incident wavelength divided by the waveguide index of refraction (i.e., $\lambda_0/(n_{wg})$). The specific grating period depends on the post index of refraction. The larger the post refractive index vs. waveguide refractive index, the smaller the ratio of wavelength to grating period 225.

Posts 206–211 may be arranged in a line or other arrangements which allow an approximately constant post-to-post spacing. For example, appropriately spaced posts may be placed along an arc having a given radius of curvature. This could be particularly advantageous for EM waves that had wavefronts with similar radii of curvatures.

Again referring to FIG. 2(a), an incident photon beam 240 may be applied to SWG 205. A portion of the incident beam 240 is reflected as photon beam 241. If a large percentage of incident beam 240 is reflected, SWG 205 is said to act as a mirror. If SWG 205 functions as a mirror over a wide range of wavelengths, SWG 205 may be said to be a broadband mirror. The reflective bandwidth of SWG 205 may be defined to be a range of wavelength values within the SWG 205 response which are within 3 dB of the SWG mirror's 205 peak reflective response. For example, if SWG 205 is fully reflective at a given center wavelength and a line is drawn at 70.71% (3 dB) below the peak reflectivity, a wavelength above and below the center wavelength will be cut. The difference between the wavelengths cut by the 3 dB line may be defined to be equal to the SWG's 205 bandwidth.

Figure 2B:
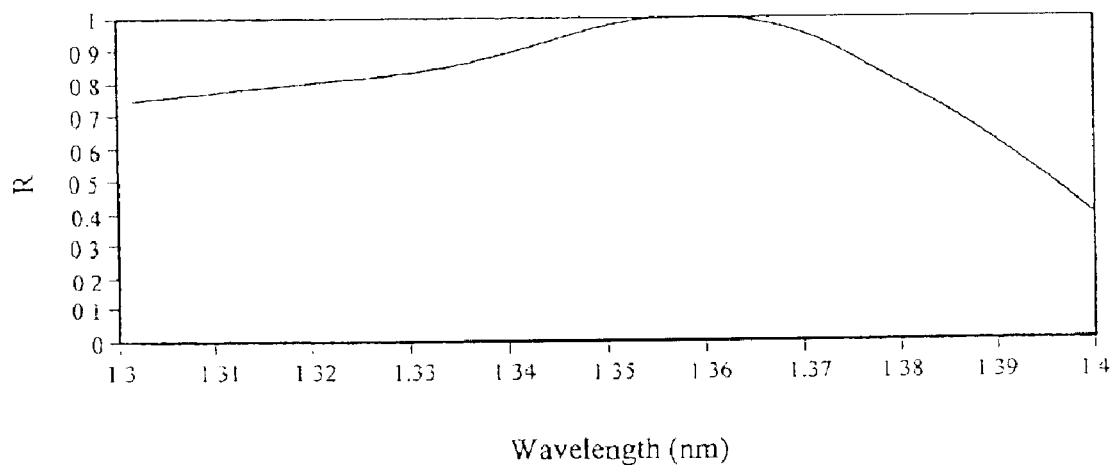
FIG. 2(b) illustrates the calculated spectral response of the SWG of FIG. 2(a), the SWG formed using a $LiNbO_3$ waveguide and square silicon posts.

FIG. 2(b) illustrates the calculated spectral response of a broadband mirror over a wavelength range of interest for the SWG 205 shown in FIG. 2(a) to an incident photon beam 240, where SWG 205 is formed in a LiNbO3 ($n_f$=2.2) waveguide with square silicon posts ($n_f$=3.5) 0.285 µm by 0.285 µm having a grating period (T) 225 of 0.57 µm. The spectral response shown in FIG. 2(b) may be characterized as that of a broadband mirror since its bandwidth extends from approximately 1.3 µm to approximately 1.38 µm, or approximately 6% of the center wavelength of 1.35 µm. A SWG 205 with the above dimensions occupies an area of only approximately 1 square micron.

Figure 2C:
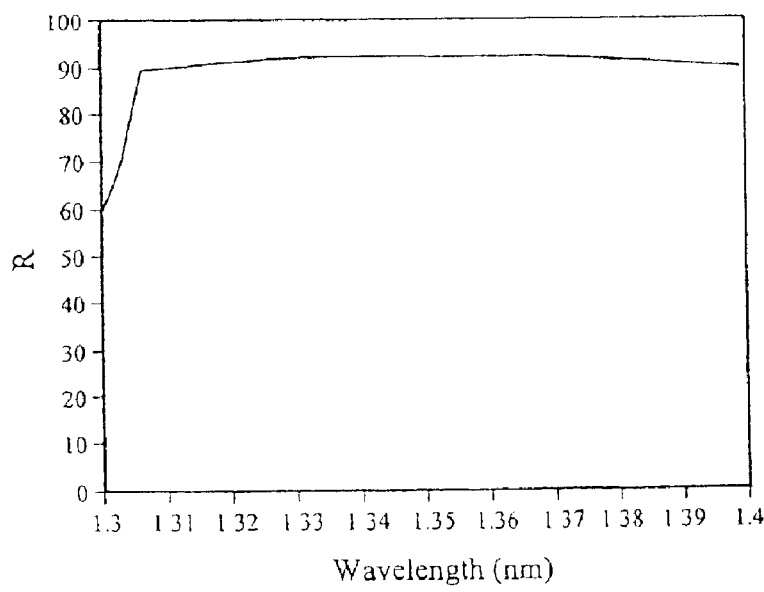
FIG. 2(c) illustrates the calculated spectral response of the SWG of FIG. 2(a), the SWG formed using a $BaF_2$ waveguide and square silicon posts.

FIG. 2(c) illustrates the calculated spectral response of a broadband SWG mirror 205 as in FIG. 2(b), except a BaF$_2$ waveguide ($n_f$=1.45) was used. A bandwidth from approximately 1.31 µm to over 1.40 µm is shown in FIG. 2(c). Both FIGS. 2(b) and 2(c) demonstrate a broadband reflectance over a wavelength range centered around 1.35 µm. This wavelength range is within the wavelength range commonly used in the telecommunications industry.

Although FIGS. 2(b) and 2(c) illustrate an SWG 205 demonstrating a broadband resonant reflectance, SWG 205 may exhibit no resonances (highly transmissive), an extremely narrow resonance, broadband resonance, or a resonance somewhere between narrow and broad. For example, Grann's grating exhibits a narrowband resonance, having a bandwidth of only a few angstroms. The transmission characteristics of SWG 205 is determined by factors including the grating period 225, the refractive index difference between the waveguide 220 and post 206–211 materials and the post shape. Determination of appropriate grating parameters for SWG 205 to act as a broadband resonant reflector requires solution of Maxwell's equation and repeated iterations through adjustments of the grating period 225, the refractive index difference between waveguide 220 material and post 206–211 material as well as the post shape.

SWG 205 may be designed to function as a broadband reflector through iterative solutions by varying SWG parameters. Software simulations are preferably used to solve Maxwell's equations applied to photons interacting with periodic embedded structures, such as SWG 205. This problem has been solved herein using "rigorous coupled wave equation" simulations. For example, GSOLVER™ grating simulation software produced by Grating Software Development Company, located in Allen, Tex., may be used to simulate photon interactions with SWG 205.

The grating variables involved in setting the spectral response of SWG 205 include the refractive index of the post 206–211 material, the refractive index of the waveguide 220 material, the grating period 225 and the fill factor, also referred to as the "duty cycle." The fill factor or duty cycle is defined as the fraction of area within the grating region containing posts. Post 206–211, waveguide 220 and cladding material 230 are chosen such that the refractive index of the post 206–211 material exceeds the refractive index of the waveguide 220 material, and the waveguide 220 material exceeds the refractive index of the cladding material 230.

A desired center resonant wavelength $\lambda_0$ is then selected. The initial fill factor may be set at 50%, for example, when the width of individual post is equal to half of the grating period 225. The required grating period 225 to achieve a desired center resonant wavelength $\lambda_0$ may be estimated. The following equation below provides an estimate of the grating period (T) 225 required to achieve a resonant reflectance at a desired center resonant wavelength $\lambda_0$, given the waveguide 220 refractive index ($n_g$) and post 206–211 refractive index ($n_{swg}$).

$$T = 3\ \lambda_0/(n_g * n_{swg})$$

However, this equation is a simple "rule of thumb" and should only generally be used as a starting point. Since the actual interactions are quite complex, a fully vectorial solution using Maxwell's equation is suggested for most applications.

Using a rigorous coupled wave equation software package, such as GSOLVER™, SWG structures, such as 205, or optical resonators formed by combining two grating structures such as 205, may be simulated over a range of wavelengths and the resulting center resonance wavelength $\lambda_0$ determined. Once a grating period 225 is found that results in the desired center resonance reflectance wavelength $\lambda_0$, the simulation may proceed to increase the grating's bandwidth.

The reflective resonance bandwidth of SWG 205 may be changed by adjusting the post fill factor and the shape of the posts, or both the fill factor and post shape. As a preferred method, the post fill factor is first either increased or decreased, and the results simulated. This iterative method may be continued until the bandwidth is maximized, or at least acceptably wide for a given application. If the bandwidth is not broad enough, the bandwidth may be further changed by changing post shape. For example, in the case of square posts, rectangular posts may be substituted and results re-simulated.

The particular manufacturing process used for fabricating the SWG 205 should preferably be inexpensive and reproducible. Conveniently, the SWG 205 of the present invention can be fabricated using any standard integrated optics or electronic integrated circuit manufacturing method. Such methods use standard oxidation, deposition, lithography and etching steps. For example, waveguide 220 may be deposited, patterned, and etched simultaneously with the formation of silicon gate electrodes during a CMOS IC process.

In applications where post geometries are deep submicron, posts 206–211 may be formed by E-beam lithography writing the desired pattern into a photoresist layer deposited on the top of the waveguide 220. Once the photoresist is developed, reactive ion etching can be used to create desired structures within the waveguiding region. The next step involves filling in the holes that have been etched away in the waveguiding region with the appropriate post material to create the SWG structure. A deposition process such as LPCVD or PECVD may be used for this purpose. Finally, a polishing step, such as chemical mechanical polishing (CMP) to improve surface flatness and to eliminate any surface irregularities caused during the process may be added to reduce the lossiness of the cavity. Thus, the very small size, simple structure and standard processing steps involved in forming SWG 205 permit fabrication on a bulk substrate material die and integration with other optical or electronic components on the same die. The particular manufacturing process used for fabricating the grating is not essential to the present invention.

Thus, the invention can a utilize a pair of SWGs, a pair of PCs, or one PC and one SWG to function as a pair of highly reflective mirrors to bound a laser cavity. As used herein, a broadband mirror refers to a mirror which is highly reflective over a range of about at least 3% of the center wavelength of the mirror, preferably 5%, and more preferable 10%. Referring again to FIG. 1(b), PC 100 provides a reflective bandwidth (bandgap 140) of about 140 nm, with a center wavelength of about 560 nm. Thus, PC 100 is a broadband mirror as it is highly reflective over a range of about 25% of its center wavelength.

The lasing wavelength of a laser cavity is determined by the resonance condition of the cavity, where the optical path length (OPL) of the cavity is an integral number (M) of half wavelengths ($\lambda/2$), where $\lambda$ is the resonance (lasing) wavelength. But since a laser cavity can in general have many resonances (due to the M integer term, e.g. M=1, 2, 3 . . . ), there are clearly other factors that specify the laser wavelength. If the mirrors are broadband, then the laser wavelength is simply determined by which resonance wavelength has the greatest gain within the gain curve of the laser.

Narrowband mirrors can still be used with the invention. However, if the mirrors are narrowband, it is more difficult to get lasing action since the narrow reflectance of the mirror must substantially coincide with the peak of the gain curve band of the laser and at least one cavity resonance wavelength to produce lasing.

Figure 3:
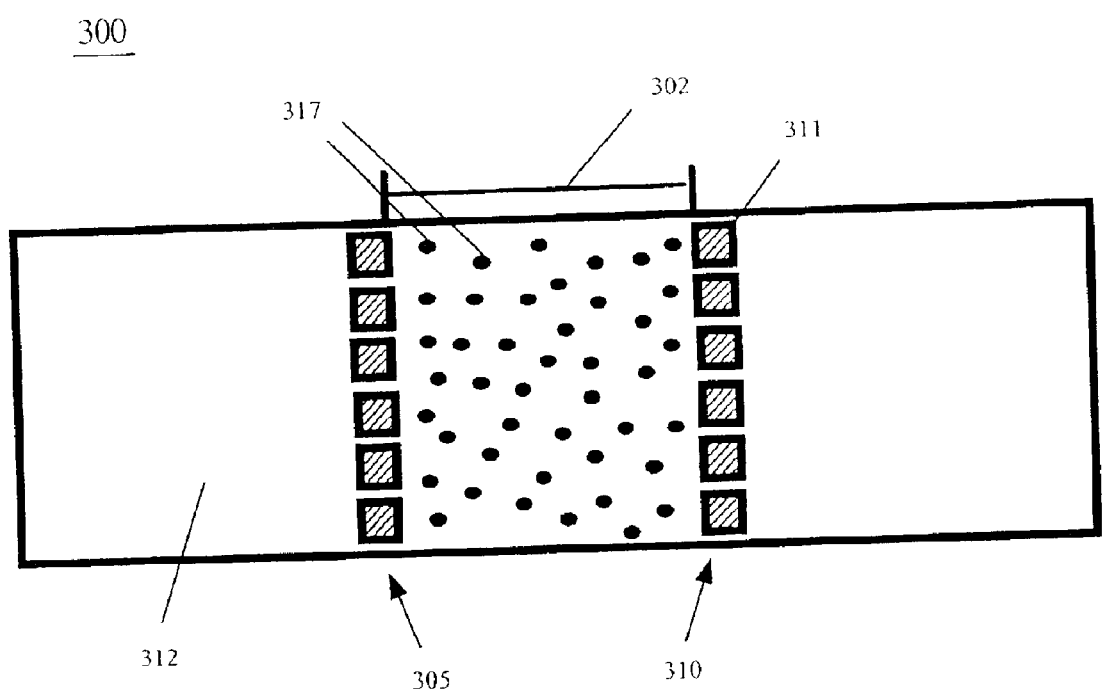
FIG. 3 illustrates a top view of an exemplary solid state laser including a pair of subwavelength reflective mirrors, the laser cavity including a waveguide having a plurality of embedded photoluminescent nanocrystals, according to an embodiment of the invention.

FIG. 3 shows a top view of an exemplary solid state laser 300 including a laser cavity 302 which comprises a waveguide material 312 including a plurality of randomly distributed photoluminescent nanocrystals 317 which function as gain media for laser 300. Laser 300 also includes first and second SWG mirrors 305 and 310 embedded within optical waveguide material 312. The first and second SWG each comprise a plurality of periodic high refractive index posts 311 which together with the optical waveguide form a Fabry-Perot waveguide laser cavity. The periodic line of posts comprising the SWGs 305 and 310 are embedded perpendicular to the direction of light propagation and have a periodicity less than the cavity resonance wavelength (subwavelength).

Laser 300 is believed to operate as follows. Since the ends of the laser cavity consist of reflective mirrors 305 and 310, it is expected that any incident light would simply be reflected. That is what happens unless the incident wavelength matches the cavity resonance. At this wavelength (there may be more that one) the incident light goes into the cavity resulting in a large energy density buildup within the cavity.

The laser cavity reaches an equilibrium when all the incident light enters the cavity and the same amount exits the other end of the cavity. This creates a Fabry-Perot resonator which is the essence of a high Q laser cavity. The amount of energy trapped in the cavity as a function of incident power is a measure of the Q of the laser cavity and is determined by the reflectivity of the cavity mirrors. The higher the Q of the cavity, the smaller the gain needs to be for lasing to occur. Assuming only a relatively modest amount of gain can be achieved, the cavity should accordingly be designed to be a high Q cavity.

Photoluminescent nanocrystals 317 generally comprise clumps of atoms or molecules, such as silicon atoms. These atoms or molecules can be introduced into the laser cavity region by any suitable technique. For example, ion implantation can be used to introduce atomic or molecular ions, which can be rendered crystalline by a suitable high temperature annealing cycle. In the case of Si, the high temperature anneal coalesces the Si atoms into Si nanocrystals. Typical photoluminescent silicon nanocrystals have diameters of less than about 10 nanometers. The embedded nanocrystals are sometimes referred to as quantum dots.

The physics and optics of certain nanocrystals have been studied quite extensively. Among the many properties that change, the most remarkable is the dramatic change in the optical properties of the nanocrystal as a function of its size. As the size of the nanocrystal decreases, the electronic excitations shift to higher energies (lower wavelengths) due to quantum confinement effects, leading the observed changes in the optical properties. The physical size of nanocrystals begins to have an effect on the optical properties around 10 nm for silicon nanocrystals, but will vary for other nanocrystal materials.

For nanocrystals below about 10 nm in size, it is well known that the emission becomes a function of their size. The photoluminescent emissions can also be controlled with the use of different morphologies for the nanocrystal. For example, a composite nanoparticle can comprise a core made from one nanocrystal material coated with a shell of a second material. In one embodiment, the outer layers of Si nanocrystals can be oxidized.

The nanocrystals introduced into the optical waveguide have physical properties, such as size or composition, that permit photoluminescence at the laser cavity resonant wavelength. Nanocrystals, such as silicon nanocrystals embedded in silicon dioxide with diameters less than 5 nm have been shown to be photoluminescent at wavelengths of about 750 nm. Although $SiO_2$ has generally been used as the optical waveguide material to form the laser, the invention is in no way limited to $SiO_2$.

There are several known alternative nanocrystal materials to Si nanocrystals which have been shown to photoluminesce in $SiO_2$. For example, it is known that Ge luminesces in $SiO_2$. For example Y. Maeda, Phys. Rev. B 51 (1995) 1658, or K. S. Min et al, Appl. Phys. Lett 68 (1996) 2511 reports Ge luminescencing in $SiO_2$. GaAs is also known to luminesce in $SiO_2$. Other nanocrystal materials that have been demonstrated to be photoluminescent candidates include other compounds, such as CdSe or ZnS.

However, a significant advantage with using silicon nanocrystals is its clear compatibility with standard (CMOS) microelectronics fabrication. A silicon based cavity laser also allows the potential for creating large numbers of NOW lasers on the same chip as well as associated electronics if desired. Thus, the invention allows for the integration of solid-state micro-lasers with semiconductor microchips on a common bulk substrate material. This integration of lasers with semiconductor microchips is made possible because the invention can be generally formed using CMOS compatible materials and processes.

Preferably, the photoluminescent nanocrystals provide a broad gain curve, such as 50 nm full width half max (FWHM) to allow optical gain to occur at any wavelength within this 50 nm region. It has been found for silicon nanocrystals that the approximately 50 nm optical gain region can be positioned by adjusting the silicon nanocrystal diameter.

The optical waveguide material is disposed on a support layer which functions as a cladding layer. The support layer is preferably selected from CMOS compatible materials. A low relative refractive index for the support layer as compared to the optical waveguide material permits the optical waveguide material to act as a substantially lossless waveguide and the support layer to act as a suitable cladding layer.

It has been found that embedded Si nanocrystals throughout a host material (the optically active region) having a thickness of about 1 µm or less work well with the invention. Thicker optically active regions may also be used with the invention. However, there may be a practical problem with thick optically active regions as it becomes more difficult to fabricate the laser cavity with thicknesses of much more than about 1 µm. At a laser cavity thickness of approximately 10 µm, for example, the optical mode structure of the laser beam can begin to change from single mode ($TEM_{00}$) operation which is very desirable to a combination of modes, which is generally undesirable.

In an optical waveguide material comprising $SiO_2$, Si nanocrystals can increase the refractive index of the $SiO_2$ region in which the embedded nanocrystals are present from about 1.5 to 1.75. At an index of refraction of 1.75, $SiO_2$ including Si nanocrystals form a waveguiding region as compared to a $SiO_2$ layer ($n_f$ about 1.5). Thus, $SiO_2$ can be used as a support/cladding layer when disposed in contact with an optical cavity comprising $SiO_2$ and a plurality of embedded Si nanocrystals.

Alternative optical waveguiding materials other than $SiO_2$ can accommodate the photoluminescent nanocrystals. Another possible alternative waveguide is a form of $SiO_2$ referred to as an aerogel. Aerogels are exceedingly porous, being about 99.8% air. Silicon nitride ($Si_xN_y$) and solgels may also be used as optical waveguide materials.

Exemplary dimensions for laser 300 shown in FIG. 3 include a resonator length of about 1 µm to a maximum of 100's of µm. A nominal resonator length is about 10 µm. If subwavelength resonant gratings are used as mirrors, the post size of the gratings can be from 0.1 µm to 0.5 µm diameter thickness. The posts must generally span the entire thickness of the waveguide, generally being embedded in the waveguide structure. For example, for a 1 µm thick active waveguide, the posts should also be about 1 µm long. A nominal post diameter is 0.25 µm. Although the posts shown in FIG. 3 are square (pegs), posts can be a variety of shapes including round (cylinders).

Post spacing requires a subwavelength, or at least close to a subwavelength periodicity. Accordingly, a periodicity of 0.30 µm to 0.70 µm could be used with a 50% fill factor. The thickness of the optical waveguide could be as thin as about 1 µm, or less, or as thick as about 1 mm. However, the thicker the waveguide is the more difficult it is to make the posts as the posts must generally extend throughout the thickness of the active waveguide region. There are also some other practical factors, such as single mode operation, that usually favor use of a thin waveguide.

The posts should have a substantially larger relative refractive index than the waveguide cavity material and be non-absorbing (a dielectric) at the lasing wavelength. If standard $SiO_2$ ($n_f$ of about 1.5) is used as the laser cavity matrix material, suitable standard optical materials which could be used for posts, including $Ta_2O_5$, $TiO_2$, ZnO, and ZnSe. If other lower refractive index laser cavity matrix materials are used, such as Aerogel which has an $n_f$ of about 1.01, almost any non-absorbing dielectric material could be used to form the posts.

Figure 4A:
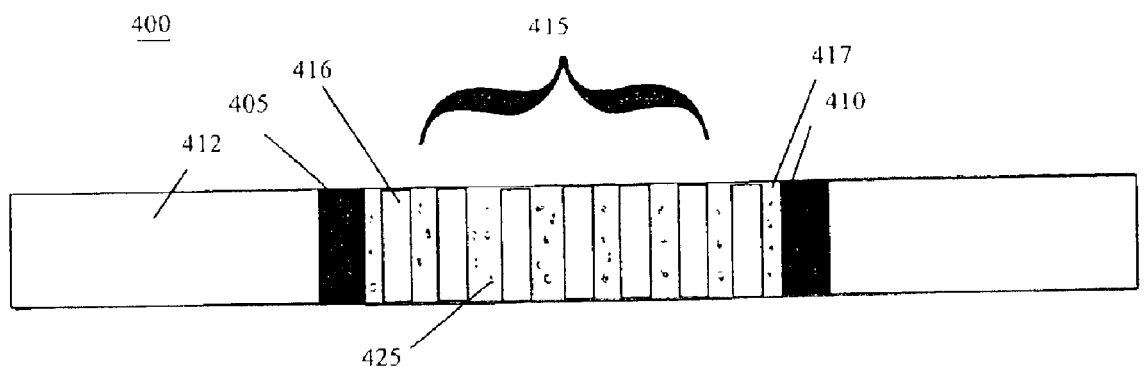
FIG. 4(a) illustrates a cross-sectional view of a solid state laser which combines subwavelength reflective mirrors with a photonic band edge structure (PBE) structure disposed between the subwavelength mirrors, the laser cavity including a waveguide having a plurality of embedded photoluminescent nanocrystals, according to an embodiment of the invention.

In another embodiment of the invention shown in FIG. 4, a cross-sectional view of NOW laser 400 is shown. Laser 400 includes first and second SWG 405 and 410 mirrors and a PBE 415 formed in the optical waveguide 412 of laser 400 between mirrors 405 and 410. A plurality of randomly distributed nanocrystals are disposed in optical waveguide 412 between SWG mirrors 405 and 410. An optical pump, such as an external Ar laser (not shown) can be used to provide optical pumping for laser 400.

SWG mirrors 405 and 410 comprise a plurality of high refractive index periodic features (not shown) relative to the refractive index of waveguide 412, SWG 405 and 410 are designed to provide a broadband reflective response. The broadband reflective range includes the desired operating wavelength of laser 400, which is generally a single wavelength.

PBE 415 is a photonic crystal (PC) which is disposed in the lasing cavity and includes a periodic array of low index features, such as holes 416. As noted relative to FIG. 1(b), PC 100 provides both a band gap 140, as well as an air band edge 144 and a dielectric band edge 148. PBE 415 can be etched in the waveguide material 412. PBE holes can be unfilled, or filled with a low relative refractive index material, such as virtually any type of gas, including air.

If laser's 400 normal lasing wavelength is within the PBE's 415 band gap (forbidden) region, no energy will be allowed to propagate within the cavity and no lasing would occur. However, if the laser is operated at a wavelength at which PBE 415 is substantially transmissive, such as at its band edge regions, lasing can occur. Preferably, PBE 415 provides a dielectric band edge which permits PBE 415 to provide substantial transmission at an operating wavelength of laser 400. As used herein, substantial transmission by PBE 415 is defined as at least 80%, and preferably 100% transmission.

The plurality of periodic cavity holes 415 are preferably provided with a periodicity which results in a dielectric band edge which coincides closely with the operating wavelength of the laser. Thus, laser 400 can operate at a wavelength that meets the conditions of being at (or near) the peak of the nanocrystal photoluminescence gain curve, being well within the broadband reflective response of SWG mirrors 405 and 410, as well as closely coinciding with the dielectric band edge wavelength of the PBE 415.

If laser 400 is operated at (or near) the dielectric band edge, such as 148 in FIG. 1(b), energy is concentrated in the high index dielectric waveguide material 425. By operating at the dielectric band edge of the PBE 415, the mode structure is forced to be single mode ($TEM_{00}$) while still having the energy concentrated in the nanocrystal material. Thus, laser 400 operated at the dielectric band edge of PBE 415 forces the cavity electromagnetic standing waves to have a single spatial and frequency mode. This dramatically improves the coherence and overall efficiency of laser 400 as the combined periodicities of the mirror features, such as, high index posts of the SWGs 405 and 410, and the low index PBE holes 416 result in a mode and phase lock of the emission by laser 400. Since photoluminescent nanocrystals are within the resulting intensified electromagnetic field, the result is an enhancement to the laser gain, thus increasing the output power of laser 400.

Figure 4B:
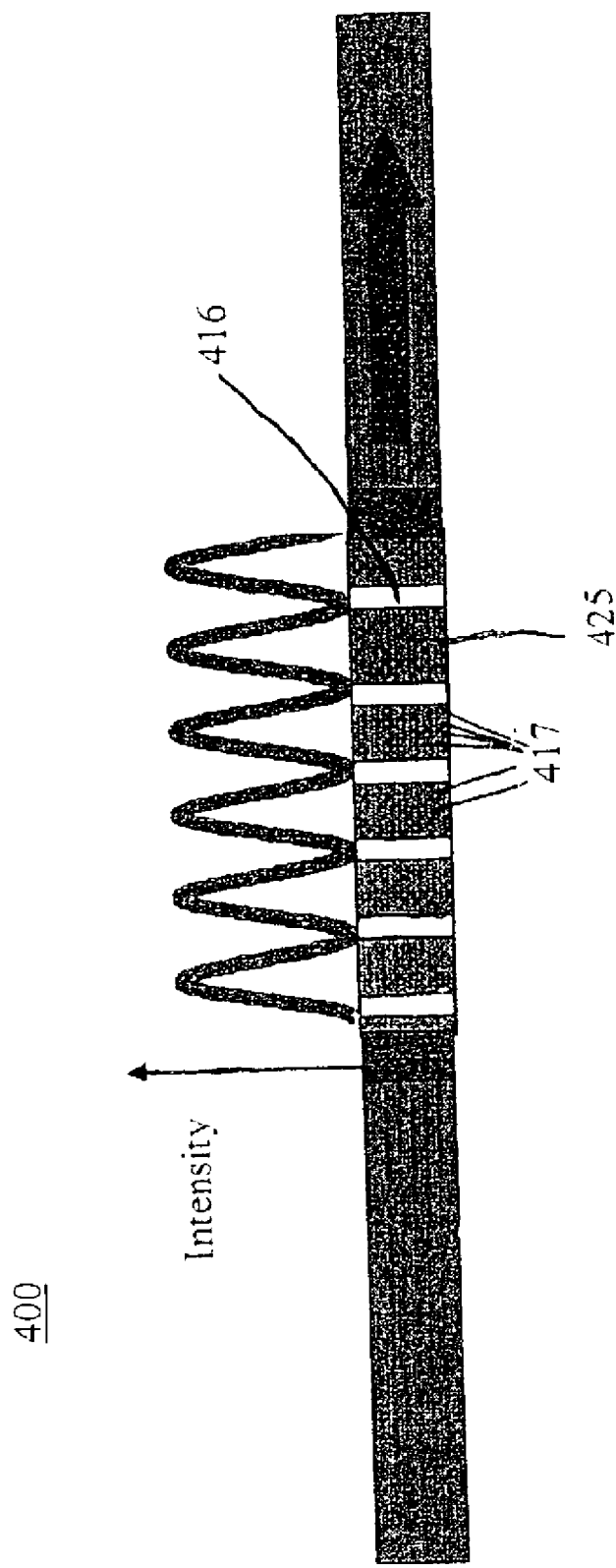
FIG. 4(b) illustrates the energy distribution in the laser cavity during laser operation at a dielectric band edge wavelength.

FIG. 4(b) shows the energy distribution operation of laser 400 operated at a dielectric band edge wavelength. Operation at the dielectric band edge forces the $TEM_{00}$ laser mode and can be seen to concentrate energy away from the holes 416 and toward the high dielectric regions 425 in the laser cavity which includes the plurality of photoluminescent nanocrystals 417. Accordingly, laser 400 including PBE 415 can significantly enhance the mode structure, coherence, efficiency and overall performance of laser 400.

Figure 5:
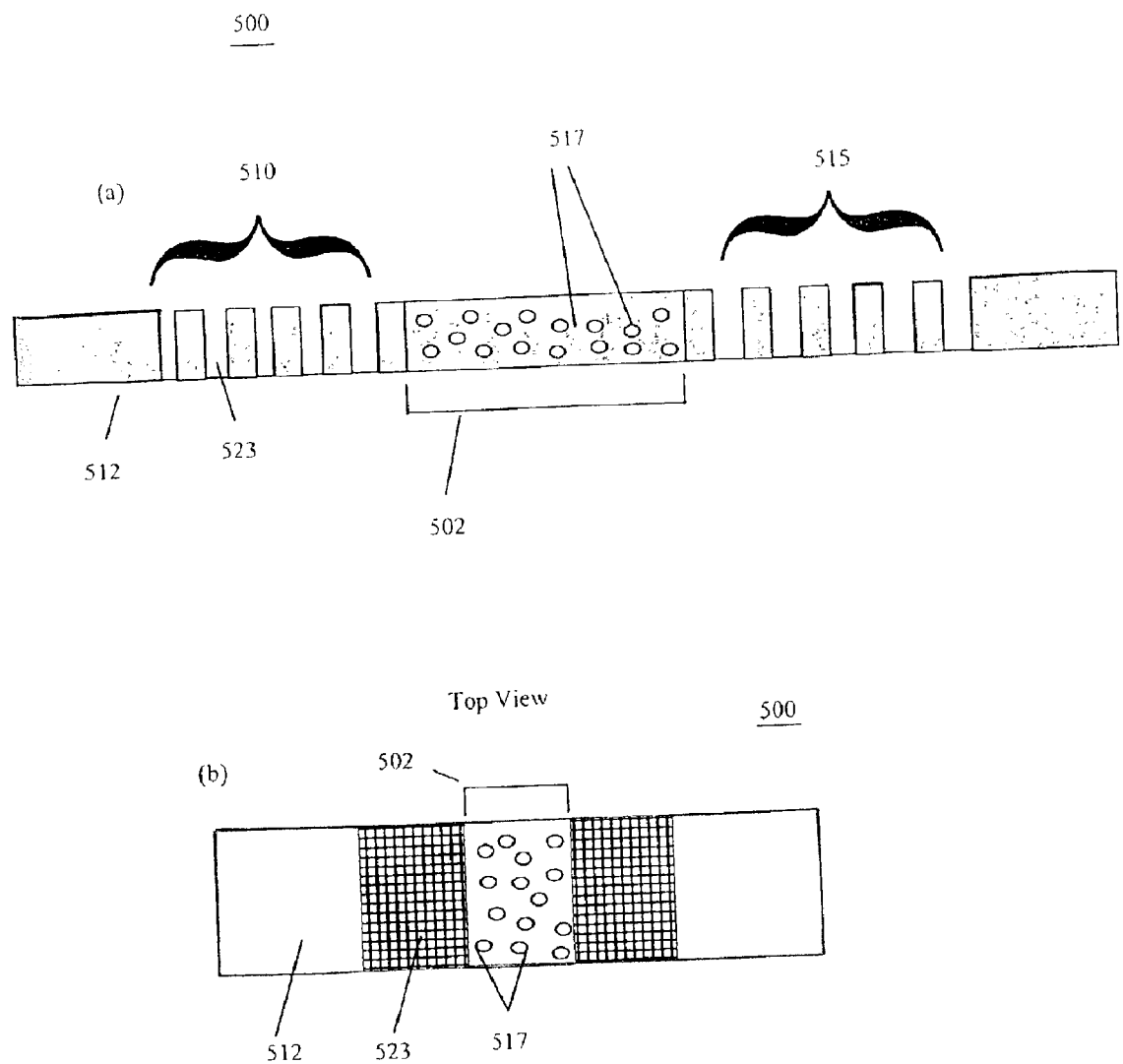

FIG. 5(a) shows a cross-section view while FIG. 5(b) shows a top view of a laser 500 which includes a pair of subwavelength mirrors 510 and 515 formed from PCs. Each PC includes a plurality of periodically spaced low refractive index features, such as holes 523 formed in optical waveguide material 512. Laser 500 includes a laser cavity 502 which comprises a waveguide material 512 including a plurality of photoluminescent nanocrystal gain media 517.

Figure 6:
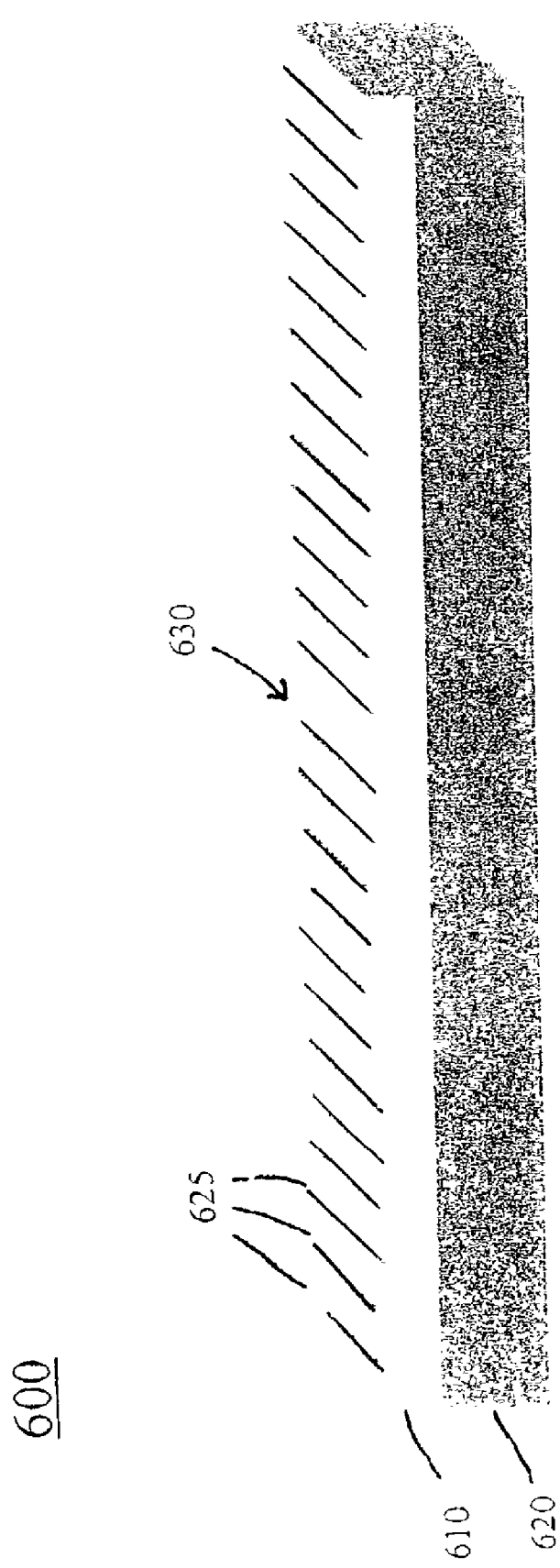
FIG. 6 illustrates a distributed feedback structure (DFB) based laser cavity, according to another embodiment of the invention.

FIG. 6 illustrates a distributed feedback structure (DFB) based laser cavity 600, according to another embodiment of the invention. As noted earlier, a NOW laser can utilize distributed Bragg reflectors (DBR) which operate through the distributed feedback effect. The DFB based cavity laser is generally simpler to fabricate as compared to cavity lasers which include subwavelength resonant gratings and/or photonic crystals, since DFBs can be formed by simply etching a plurality of grooves in a waveguide.

A unique feature of a distributed feedback structure (DFB) is it produces an effective mirror reflectance without having actual mirrors. As a wave propagates through the waveguide it encounters the subwavelength grating provided by the DFB. During each cycle of the grating a small amount of light energy is coherently reflected constructively backward. This can be a very small amount of reflection for each period. But if enough periods are provided, virtually all the light will get reflected back toward the center of the structure (i.e. a mirror). At the center of laser cavity 600 the periodicity is offset slightly, such as quarter optical wave offset 630. This causes the distributed reflectances to channel light toward the center of laser cavity 600 from both directions and gives the effect of having a two mirror laser cavity.

By having an offset, such as the quarter optical wave offset 630, the structure is forced to act as two distributed mirrors which creates a distributed laser cavity, where the cavity and mirrors are distributed throughout the entire etched groove region. Although grooves 625 are shown as having linear dimensions, grooves can also be curved (not shown).

In one embodiment of the invention, the NOW laser is formed by disposing (or forming) a distributed feedback structure on or in the waveguide, the waveguide including a plurality of embedded photoluminescent nanocrystals. For example, a silicon dioxide substrate 610 or a thick film of silicon dioxide on a silicon wafer (not shown) can be ion implanted with silicon. The structure can then be annealed to form a top silicon dioxide region including silicon nanocrystals disposed on the silicon dioxide portion not including silicon nanocrystals 620. A plurality of grooves 625 are then formed by selective etching in silicon nanocrystal region 610. Preferably, a thin film (e.g. 2 $\mu$m) of silicon dioxide is deposited top of the laser cavity 600 (not shown) to create a symmetric grooved waveguide region.

An advantage of the DFB cavity structure 600 is that it is relatively simple to fabricate. In addition, a significant advantage of a DFB structure is that a single spectral mode can be provided without the occurrence of mode hopping. The spatial modes are determined by the channel waveguide physical characteristics, which can easily be configured for single mode operation. Disadvantage of DFB cavity structure 600 include it generally requires many periods (e.g. over 100) to produce a substantial cavity Q factor. In addition, the precision placement of grooves is needed over a large number of periods for proper phasing. Accordingly, formation of a practical NOW laser using a DFB structure 600 may require specialized lithography equipment, such as interference optical lithography to pattern the plurality of grooves.

In another embodiment of the invention, a symmetric waveguide laser cavity can be formed. For example, by adding an additional thin film, such as a few microns or less of $SiO_2$ on top of the waveguide region which includes the photoluminescent nanocrystals, a symmetrical waveguide cavity can be formed.

Figure 7:
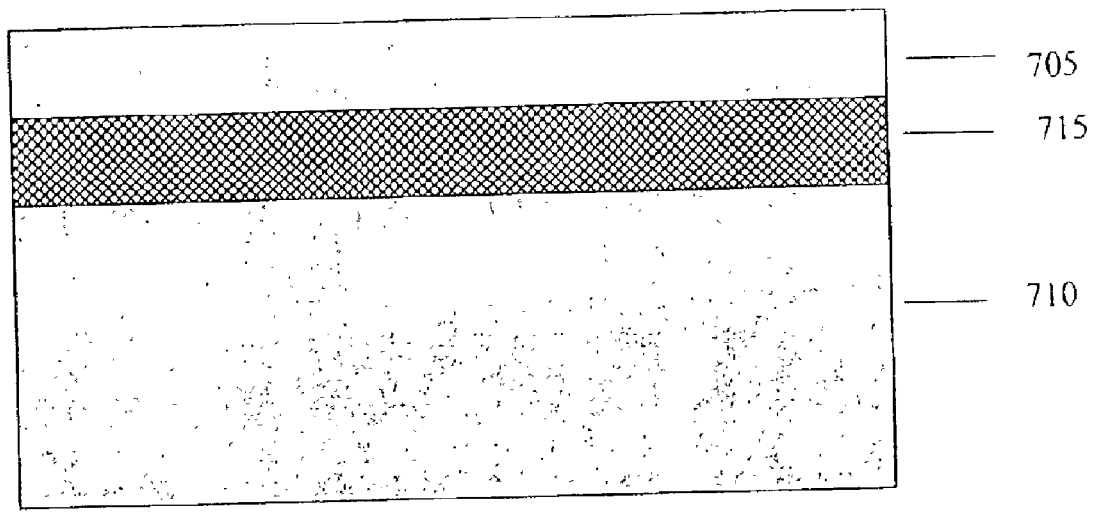
FIG. 7 illustrates a symmetrical optical waveguide structure formed using a top and bottom layer of cladding material to sandwich a layer of waveguide material having embedded photoluminescent nanocrystals therein, according to an embodiment of the invention.

For example, FIG. 7 shows a symmetrical optical waveguide structure 700 formed using a top layer 705 and bottom layer 710 of a particular cladding material to sandwich a layer of waveguiding material having embedded photoluminescent nanocrystals 715. Although it is preferred to have top 705 and bottom layer 710 to be formed from the same material, different materials having near equal indexes of refraction may also be used for top layer 705 and bottom layer 710.

A major advantage of forming a symmetrical waveguide structure is that at least one optical mode will always exist within the waveguide. The symmetrical nature of optical waveguide structure 700 having the same top and bottom cladding layer surrounding the thin film waveguide means that the energy will be symmetrically distributed in the waveguide. This is referred to as a symmetric mode. In symmetric waveguides there is always at least one confined mode. Single mode performance is generally achieved by selecting a relatively thin waveguide material, such as about 1 $\mu$m for most waveguide materials.

If the waveguide is asymmetrical, it is possible that the waveguide will not support any transmission. In addition, the energy leakage from the symmetric waveguide is minimized relative to an asymmetric structure. Finally, the dominate mode in a symmetric waveguide is generally desired $TEM_{00}$ mode, which consists of a Gaussian wave front.

In a preferred embodiment, the symmetrical waveguide structure is configured by forming a membrane waveguide structure in the laser cavity. A membrane is a suspended region of unsupported thin film, such as a region where the underlying support layer, such as a bulk substrate material, has been removed.

For example, a 1 $\mu$m film of silicon dioxide can be deposited on a bulk silicon substrate. Part of the silicon substrate can be removed (e.g. etching) from the back side to leave an unsupported region on the substrate. The remaining thin film (e.g. 1 $\mu$m) of silicon dioxide is called the membrane. The flat profile silicon ion implantation takes place in the membrane, and the Fabry Perot cavity mirrors are placed around the implanted region, and in the membrane. Thus the laser will be formed in the membrane.

An exemplary detailed method is provided below for forming a membrane structure including a thin (e.g. 1 $\mu$m) silicon dioxide membrane is described below. Other methods for forming membrane structures will be apparent to skilled in the art.

1. Provide an n-type silicon wafer with a <100> orientation. The wafer can be phosphorous or arsenic doped, but should not be boron doped.

2. Deposit, a 1 $\mu$m film of silicon dioxide by chemical vapor deposition, such as plasma enhanced chemical vapor deposition (PECVD) or grow the silicon dioxide layer thermally, such as in steam.

3. Deposit 100 nm of a metal such as chromium on both sides of the Si wafer. The purpose of chromium is a protective layer (or absolute etch stop) for chemical etching of silicon).

4. Spin photoresist and pattern the backside of the chromium with a photolithography mask. This forms an imprint on the chromium. The mask can include about 1–2 mm squares.

5. Use a chromium chemical etchant, or a reactive ion etcher (RIE) to remove the chromium in the patterned regions, but leave the rest of the chromium intact. This structure now has a region of squares in which silicon is exposed, but the rest of the wafer is protected with chromium.

6. The wafer is them ready to be silicon etched. Silicon can be chemical etched in a solution of potassium hydroxide (KOH), which is preferably heated to about 80° C., and constantly agitated, to preferentially etch the <100> plane of Si, and leave the <111> plane intact. The etch rate is about 2 µm per minute. Preferential etching forms pyramid-like walls which are sculpted out. The etching takes about 5–6 hours depending on the wafer thickness. Eventually when all the Si has been etched, it appears as if a window opens up in those etched areas, and membranes are left. KOH does not etch chromium at all (absolute etch stop) and is selective about etching silicon dioxide, providing approximately a 1000:1 preference to Si.

7. The chromium can then be removed by a chromium etchant, leaving a wafer with a series of membrane windows on it.

The membrane structure provides a preferred symmetric waveguide structure. The high contrast in refractive index between the Si implanted silicon dioxide (approx 1.6–1.7) and air (nearly 1) means that the energy will be well confined to the membrane and that there will be no significant evanescent wave, leakage, or loss into the air, surrounding the membrane. The air forms a very good cladding layer relative to the Si implanted silicon dioxide. This a confined mode. Since this structure provides a very high contrast in refractive index, this membrane will generally provide the best possible waveguide achievable.

Because most of the energy will be confined to the membrane, this will enhance the quality of the Fabry Perot Cavity, and subsequently lasing. In a preferred embodiment using a silicon dioxide membrane, the membrane thickness is about 1 µm. Membranes can be thicker or thinner. However, as the membrane thickness gets too large (e.g. 10 µm) multiple modes can begin to result. Thus, the choice of a 1 µm thin silicon dioxide film will allow for single mode propagation, as in a single mode fiber.

In addition, the membrane structure allows laser light to be coupled out of the membrane of the laser with the assistance of optical fibers. The optical fibers can be tapered down to match the thickness of the membrane. In addition, an index matching fluid can be used at the membrane to optical fiber junction to eliminate virtually all light loss.

Nanocrystals can be produced having sizes virtually anywhere in the nm range. To produce silicon nanocrystals, for example ion implantation has been successfully used. Silicon ions can be implanted into a thin film of silicon dioxide (glass). Silicon is generally implanted at room temperature, although other temperatures can be used as well. The starting implanted Si concentration significantly influences the size and the properties of the nanoparticles which are formed after annealing. At a sufficiently low enough implanted dose, the Si dissolves in the substrate and no particles are formed. It is estimated that a minimum concentration to form Si nanocrystals is about $5.0 \times 10^{20}/cm^3$.

Annealing forces the embedded silicon atoms to coalesce into silicon nanocrystals. The size of the nanoparticles depends on processing conditions. The anneal should generally be performed at 1000° C. or more, such as 1100° C. which has generally been used. A 1100° C. anneal has been performed for 1 hr, but luminescence is possible for shorter or longer anneals. The luminescence intensity is generally a function of the anneal time. It generally reaches a maximum after a short time, then monotonically decreases with anneal time. Intense photoluminescence has been observed from particles 1 to 5 nm in diameter.

To produce a uniform distribution (matrix) of atoms throughout the thickness of the cavity waveguide material, such as $SiO_2$, multiple ion energies can be used during implantation to adjust the implantation depth. Once a fairly uniform distribution of silicon atoms has been implanted, the film is then preferably annealed.

It is believed that the amount of luminescence is dependent on particle size. The particles generally grow with annealing. The anneal ambient can make a significant difference in the level of luminescence seen and this is believed related to how the Si nanoparticles are terminated. Having hydrogen in the sample near the nanoparticles can increase the luminescence, likely by chemically bonding at the $Si/SiO_2$ interface and thereby decreasing non-radiative paths for de-excitation. Annealing in forming gas ($Ar+4\%H_2$) also works well. Annealing in $N_2+H_2$ can also be used. After annealing in Ar or in $O_2$ or in vacuum there is still observed luminescence, but the level is generally greatly reduced. The effect is cyclable. The hydrogen around the nanoparticles can be reduced with an Ar anneal, then the hydrogen can be reintroduced onto the nanoparticles with an $Ar/H_2$ anneal to recover the photoluminescence properties of the nanocrystal.

The laser can also be wavelength tunable. For example, the laser wavelength is based on both the size of the nanocrystals and on the laser cavity architecture, both of which can be designed for a given lasing wavelength. The laser may be customized for laser wavelengths over a fairly broad wavelength range, such as from 0.6 µm to 1.3 µm.

The laser can be dynamically wavelength tunable as well. If the laser cavity is comprised of an electro-optic waveguide material, such as SBN, CdTe and $LiNbO_3$, and if the waveguide material separating reflective mirrors is positioned between two electrodes, the cavity's optical path length can be varied by application of a voltage across the electrodes. Electro-optic materials are materials that have refractive indices that can be altered by application of an electric field. Since the cavity's optical path length (OPL) is a function of the physical grating separation distance (d) multiplied by the waveguide's index of refraction (n), a change in the waveguide's index of refraction shifts the optical path length. A change in the cavity's optical path length shifts the center resonant wavelength an amount $\Delta\lambda$:

$$\Delta\lambda=(2d(\Delta n))/m, \text{ where m is possible cavity modes}=1,2,3\ldots\text{ For a single mode cavity, } \Delta\lambda=2d(\Delta n).$$

The term cavity mode in this context is different than the modes discussed earlier. Cavity mode refers to a wavelength mode, where as the modes previously discussed have been spatial modes of energy distribution from a particular wavelength.

Application of a voltage across an electro-optic cavity having a Q significantly greater than 1 causes an electro-optic amplification effect because of the electromagnetic wave reflections within the cavity. The electro-optic effect amplification allows a beam of photons to be modulated with a correspondingly lower applied voltage due to a lengthened residence time in the resonant cavity. For example, an electro-optic cavity having a Q of 500 allows a voltage equal to 1/500 of the voltage otherwise required to modulate an electro-optic cavity having a Q equal to 1. Thus, a low voltage optical modulator may be realized which allows higher switching speeds and compatibility with state of the art integrated circuits which use very low power supply voltages, such as 1 volt, or less.

It is estimated that by adding electrodes and using an electro-optic waveguide material instead of $SiO_2$ (glass), the resulting laser could be tunable over tens of nanometers of wavelength. A routing experimentation can be used to identify alternative waveguide materials to $SiO_2$ that allows the silicon nanocrystals to produce enough photoluminescence to function as an optical gain media.

Pumping the active media can be provided by any suitable technique. For examples, electrodes could be used to supply electrical pumping to the active gain media.

The laser can be operated as laser/modulator. For example, the laser can be indirectly modulated. For example, if the pumping energy, such as UV light, were to be amplitude or frequency modulated, then the laser output intensity could be correspondingly modulated.

This invention has a broad range of possible uses and applications. As an example, low power laser sources could be used for at the active component in chemical or biological sensors. The ability to integrate lasers into semiconductor microchips can lead to practical optical computers, integrated optical interconnects, and new integrated optical modulators. By coupling a second resonant cavity (sensor) to the NOW laser cavity, laser radiation could be nominally passed through the second structure, assuming that both cavities are tuned to the same wavelength. If a chemical or biological agent is then passed through the sensor part via PC holes within the sensor cavity, the sensor cavity will modify the intensity of the transmitted beam based on the composition of the agent or chemical. By making an array of such laser and sensor cavities, each tuned to a slightly different wavelength, and by monitoring the composite transmission from these arrays, an extremely sensitive and accurate chemical and biological detector device can be configured.

Optical computing can become practical with the small embedded laser sources described herein. Each laser source can effectively be a digital input variable. The creation of integrated optical gates has been established researchers of many years. The problem with optical computing is not with creating logic gates, but is with generating integrated optical sources. This invention solves this problem by providing the required integrated optical sources.

Integrated optical interconnects can also be formed using the invention. Again the problem with using optical interconnects is one of creating, transmitting, and detecting modulated optical sources. The NOW lasers can provide integrated light sources internal to the microchip. Modulation of these sources can be accomplished in a variety of ways, such as direct laser modulation through electronic pumping, Q switching via the use of photonic band edge holes within the cavity, or by modulation of the mirror reflectance using EO materials to make PC mirrors.

EXAMPLES

The present invention is further illustrated by the following specific examples. The examples are provided for illustration only and are not to be construed as limiting the scope or content of the invention in any way.

Figure 8:
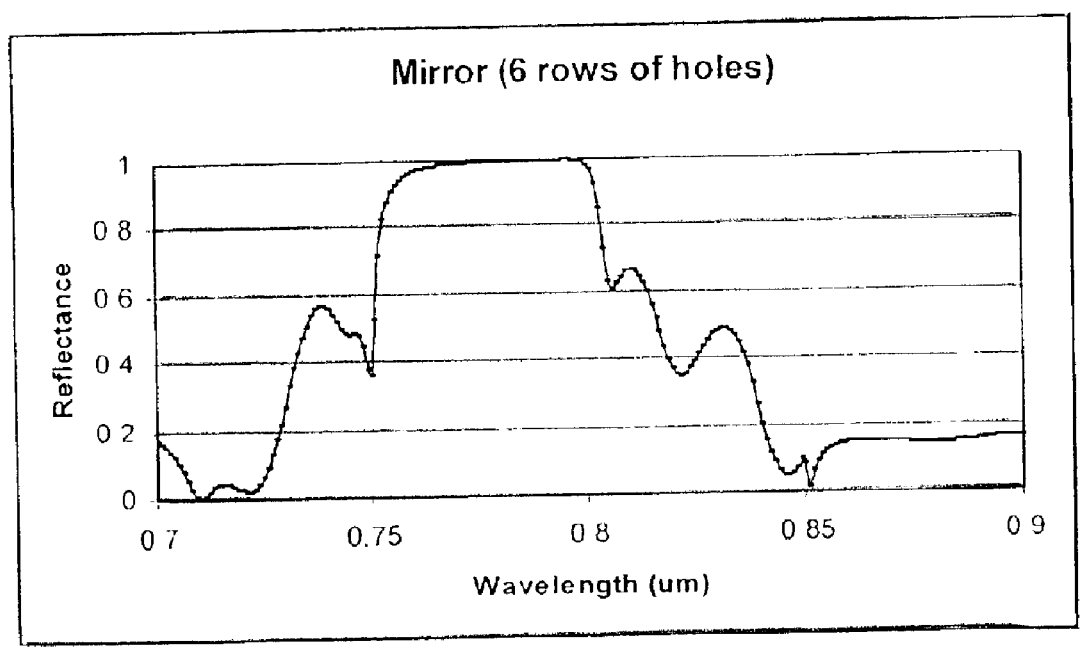
FIG. 8 is a plot of reflectance versus wavelength for a $SiO_2$ thin film waveguide, the waveguide including six (6) rows of holes etched therethrough.

FIG. 8 is a plot of reflectance of a waveguide mode (single spatial mode waveguide $TEM_{00}$) propagating through a channel waveguide versus wavelength. There was no nanocrystal gain media present in the waveguide. The waveguide was a silicon dioxide thin film channel waveguide with a PC formed from 6 rows of holes etched through a waveguide comprising 1 μm film of silicon dioxide.

The width of the film was 7 μm and the length was 10 μm. The PC holes were spaced 0.7 μm apart within each row and had a diameter of 0.46 μm. The row to row hole spacing was 1.1 μm. FIG. 8 indicates that for a band of wavelengths there is nearly total (~100%) reflectance of incident optical power.

Figure 9:
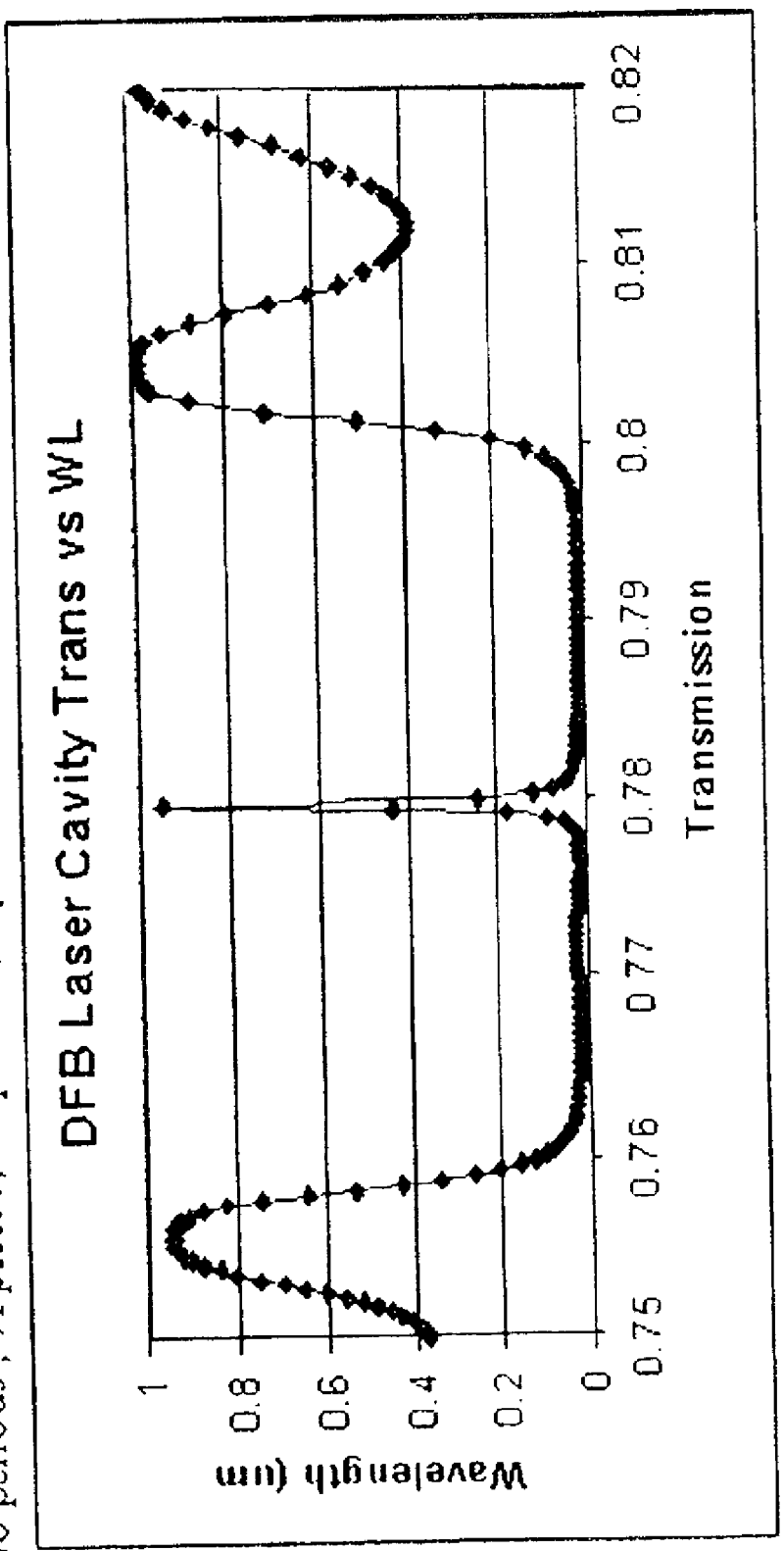
FIG. 9 is a plot of transmission versus wavelength for the distributed feedback structure (DFB) based laser cavity illustrated in FIG. 6.

FIG. 9 illustrates a plot of transmission versus wavelength for the distributed feedback structure (DFB) based laser cavity 600 shown in FIG. 6. The simulations shown are not laser stimulated emission simulations, but are laser cavity simulations which treat structure 600 as a resonant filter (i.e. having incident coherent light hit the left hand side of the structure shown in FIG. 6).

The simulation assumed a 2.5 μm thick block of $SiO_2$ with the top 0.5 μm (reference 610) containing silicon nanocrystals ($n_f$=1.6). The very top of the structure has 100 μm long grooves 625 etched in it. A cross section (not shown) of each period would show 130 nm etched a depth of 100 nm with 130 nm not etched (a 260 nm periodicity).

Evaluated over 40 periods FIG. 9 shows a sharp transmission peak at about 0.78 μm and demonstrates a Q of about 950. If desired, higher Q can be obtained by increasing the number of grating periods. Accordingly, distributed feedback structure (DFB) based laser cavity 600 can be used to form a NOW laser according to one embodiment of the invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A solid state laser, comprising:
   an optical waveguide, said waveguide providing a first refractive index,
   a laser cavity defined by first and second subwavelength mirrors in said waveguide, said first and second subwavelength mirrors selected from (i) subwavelength resonant gratings wherein said first and second subwavelength resonant gratings each comprise a plurality of periodically spaced high refractive index features disposed in said waveguide, said high refractive index features providing a refractive index higher than said first refractive index and (ii) photonic crystals, said photonic crystals having a plurality of low refractive index index features in said waveguide, said low refractive index lower than said first refractive index, and
   a plurality of photoluminescent nanocrystals in said laser cavity.

2. The laser of claim 1, wherein said first and said second subwavelength mirrors comprise a pair of said photonic crystals.

3. The laser of claim 1, wherein said first and said second subwavelength mirrors comprise said photonic crystal and said subwavelength resonant grating respectively.

4. The laser of claim 1, wherein said optical waveguide comprises silicon dioxide.

5. The laser of claim 1, further comprising a photonic band edge structure (PBE) positioned between said first and second subwavelength mirrors.

6. The laser of claim 5, wherein said PBE provides a dielectric band edge which permits said PBE to provide at least 80% transmission at an operating wavelength of said laser.

7. The laser of claim 1, wherein said plurality of nanocrystals comprise silicon.

8. The laser of claim 1, wherein said optical waveguide comprises at least one selected from the group consisting of $SiO_2$, $Si_xN_y$, aerogels and solgels.

9. The laser of claim 1, said laser is disposed on or embedded in a bulk substrate material.

10. The laser of claim 1, wherein said optical waveguide in said laser cavity comprises a membrane layer, said membrane layer suspended above said bulk substrate material.

11. The laser of claim 10, wherein said membrane layer comprises silicon dioxide and said plurality of photoluminescent nanocrystals comprise silicon.

12. The laser of claim 9, wherein said bulk substrate material comprises silicon.

13. The laser of claim 1, wherein said optical waveguide comprises an electro-optic material.

14. The laser of claim 13, further comprising a pair of electrodes for application of a modulating electrical field across said electro-optic waveguide material.

15. The laser of claim 9, further comprising structure for electrical pumping said laser, said structure for electrical pumping disposed on said bulk substrate material.

16. The laser of claim 15, wherein said structure for electrical pumping comprises an on-chip RF oscillator.

17. The laser of claim 1, wherein said features of said subwavelength resonant grating are formed from materials selected from the group consisting of $Ta_2O_5$, $TiO_2$, ZnO and ZnSe.

18. The laser of claim 1, wherein said laser sustains substantially only one propagating mode.

19. A method for forming a solid state laser, comprising the steps of:
providing an optical waveguide;
forming a laser cavity including first and second subwavelength mirrors disposed in or on said optical waveguide, said first and second subwavelength mirrors selected from (i) subwavelength resonant gratings wherein said first and second subwavelength resonant gratings each comprise a plurality of periodically spaced high refractive index features disposed in said waveguide, said high refractive index features providing a refractive index higher than said first refractive index and (ii) photonic crystals, said photonic crystals having a plurality of low refractive index features in said waveguide, said low refractive index lower than said first refractive index, and
positioning a plurality of photoluminescent nanocrystals in said laser cavity.

20. The method of claim 19, further comprising the step of forming said plurality of photoluminescent nanocrystals.

21. The method of claim 20, wherein said forming step comprises the steps of:
disposing photoluminescent nanocrystal precursor into said laser cavity, and
annealing said photoluminescent nanocrystal precursor, wherein said photoluminescent crystal precursor coalesces to form said plurality of photoluminescent nanocrystals.

22. The method of claim 21, wherein said disposing step comprises ion implantation.

23. The method of claim 22, wherein said ion implantation is performed at a plurality of implantation energies.

24. The method of claim 19, wherein said first and second subwavelength mirrors each comprise said subwavelength resonant gratings.

25. The method of claim 24, wherein said first and second subwavelength mirrors each comprise said photonic crystals.

26. The method of claim 24, wherein said first and second subwavelength mirrors comprise said photonic crystal and said subwavelength resonant grating, respectively.

27. The method of claim 19, wherein said optical waveguide comprises silicon dioxide.

28. The method of claim 19, further comprising the step of forming a photonic band edge structure (PBE) between said first and second subwavelength mirrors.

29. The method of claim 28, wherein said PBE provides a dielectric band edge which permits said PBE to provide at least 80% transmission at an operating wavelength of said laser.

30. The method of claim 19, wherein said plurality of nanocrystals comprises silicon.

31. The method of claim 19, wherein said optical waveguide comprises at least one selected from the group consisting of $SiO_2$, $Si_xN_y$, aerogels and solgels.

32. The method of claim 19, wherein said laser is disposed on or embedded in a bulk substrate material.

33. The method of claim 32, wherein said step of forming said laser cavity further comprises forming a membrane layer, said membrane layer suspended above said bulk substrate material.

34. The method of claim 33, wherein said membrane layer comprises silicon dioxide and said plurality of photoluminescent nanocrystals comprise silicon.

35. The method of claim 32, wherein said bulk substrate material comprises silicon.

36. The method of claim 19, wherein said optical waveguide is formed from an electro-optic material.

37. The method of claim 36, further comprising the step of forming a pair of electrodes, said electrodes for application of a modulating electrical field across said electro-optic material.

* * * * *